United States Patent
Osti et al.

[11] Patent Number: 5,833,045
[45] Date of Patent: Nov. 10, 1998

[54] VARIABLE-CAPACITY PRODUCT STORE

[75] Inventors: Roberto Osti, Zola Predosa; Fiorenzo Draghetti, Medicina, both of Italy

[73] Assignee: G.D. Societa' Per Azioni, Bologna, Italy

[21] Appl. No.: 658,608

[22] Filed: Jun. 5, 1996

[30] Foreign Application Priority Data

Jun. 7, 1995 [IT] Italy ................................ BO95A0285

[51] Int. Cl.⁶ .................................................. B65G 43/00
[52] U.S. Cl. .......................... 198/444; 198/577; 198/594; 198/778
[58] Field of Search .................... 198/444, 572, 198/577, 594, 778

[56] References Cited

U.S. PATENT DOCUMENTS

| | | | |
|---|---|---|---|
| 2,932,376 | 4/1960 | Millington | 198/594 |
| 4,018,325 | 4/1977 | Rejsa | 198/594 |
| 4,413,724 | 11/1983 | Fellner | 198/594 |
| 4,572,354 | 2/1986 | Jan ter Bals | 198/594 |
| 4,881,635 | 11/1989 | Raschke | 198/594 |
| 5,413,213 | 5/1995 | Golz et al. | 198/778 |
| 5,490,589 | 2/1996 | Golz et al. | 198/594 |
| 5,680,923 | 10/1997 | Gram | 198/778 |

FOREIGN PATENT DOCUMENTS

| | | |
|---|---|---|
| 581143 | 2/1994 | European Pat. Off. . |
| 0950032 | 2/1964 | United Kingdom . |
| 995663 | 6/1965 | United Kingdom . |
| 1299174 | 12/1972 | United Kingdom . |
| 2189455 | 10/1987 | United Kingdom . |

*Primary Examiner*—Joseph E. Valenza
*Attorney, Agent, or Firm*—Klauber & Jackson

[57] ABSTRACT

A variable-capacity store for products, the store presenting an endless conveyor belt extending along a given annular path; an input station and an output station, both movable along the path and defining, between them, a transportation portion of the conveyor belt, the transportation portion transporting the products substantially continuously and at adjustable speed from the input station to the output station; and an actuating device for moving the input station and the output station along the path to vary the length of the transportation portion and, hence, the capacity of the store.

9 Claims, 4 Drawing Sheets

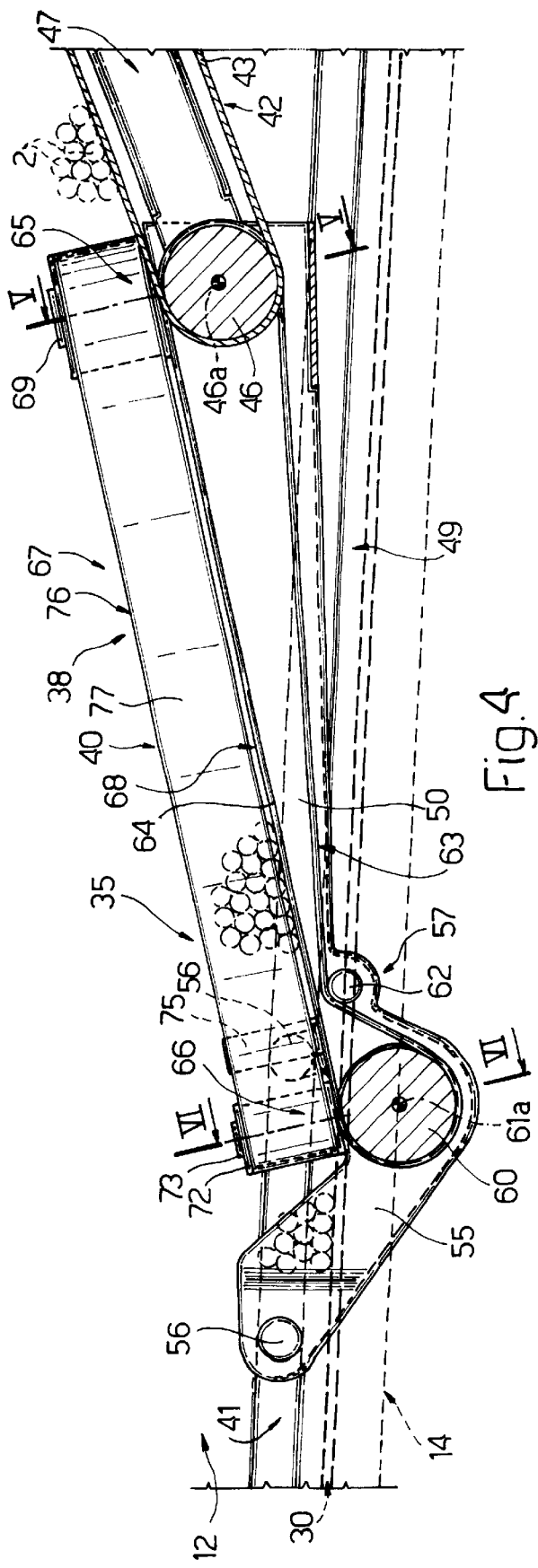
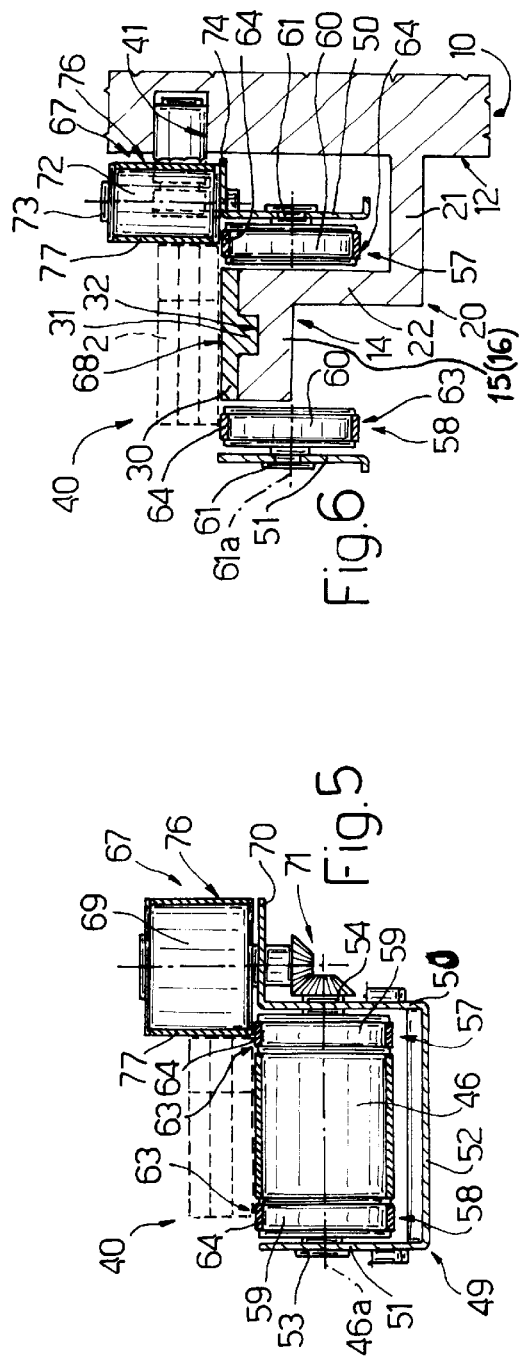

VARIABLE-CAPACITY PRODUCT STORE

BACKGROUND OF THE INVENTION

The present invention relates to a variable-capacity product store.

In particular, the present invention relates to a variable-capacity store for tobacco products, such as cigarettes, filters or packets of cigarettes; and, in the following description, reference will be made, purely by way of a non-limiting example, to a store located between a cigarette manufacturing or supply machine and a packing or receiving machine, for storing and/or supplying variable quantities of cigarettes to compensate for any difference in the quantity of cigarettes produced and the quantity of cigarettes packed.

Patents EP 581,143 and GB 995,663 relate to first in, first out variable-capacity stores comprising a conveying device for feeding a mass of cigarettes along a given path and in turn comprising a first and second transportation branch extending in series between an input station and an output station at each end of the path. The first and second transportation branches are connected to each other by a deflecting device, which is movable along the transportation branches to vary the length of the branches occupied by the cigarettes and, hence, the capacity of the store.

A drawback of variable-capacity stores of the above type is that, at the crossover points between the first transportation branch and the deflecting device, and between the deflecting device and the second transportation branch, the cigarettes are continually stressed by the deflecting device and subject to damage.

SUMMARY OF THE INVENTION

It is an object of the present invention to provide a "first in, first out" variable-capacity store designed to overcome the aforementioned drawback.

According to the present invention, there is provided a variable-capacity store for products, which is located between a supply machine supplying the products and a receiving machine receiving the products, to compensate for any difference in the output of said machines; the store comprising an endless conveyor belt extending along a given path; first actuating means for feeding said conveyor belt along said path at an adjustable speed; and an input station and an output station for the products; the stations defining, between them, a transportation portion of the conveyor belt; characterized in that said stations are movable along said path; second actuating means being provided to so adjust the positions of said stations along said path as to vary a length of said transportation portion as a function of said difference in output.

According to a preferred embodiment of the above store, said path is of fixed annular shape.

Preferably, said path of the above store presents a substantially helical portion in turn presenting two opposite ends; and a connecting portion connecting said two ends; the input and output stations being movable along the helical portion.

Preferably, also, said helical portion comprises two oppositely-inclined spiral portions and an intermediate connecting portion; the input and output stations each being movable along a respective said spiral portion.

Preferably, also, said second actuating means comprise a drum presenting a vertical axis coaxial with said helical portion; first guide means for guiding said helical portion, and which are fitted to said drum and connected in sliding manner to said helical portion; and drive means for rotating said drum about said axis.

BRIEF DESCRIPTION OF THE DRAWINGS

A non-limiting embodiment of the present invention will be described by way of example with reference to the accompanying drawings, in which:

FIG. 4 shows a section along line IV—IV in FIG. 3;

FIGS. 5 and 6 show sections along lines V—V and VI—VI in FIG. 4.

DETAILED DESCRIPTION OF THE INVENTION

Figure 1:
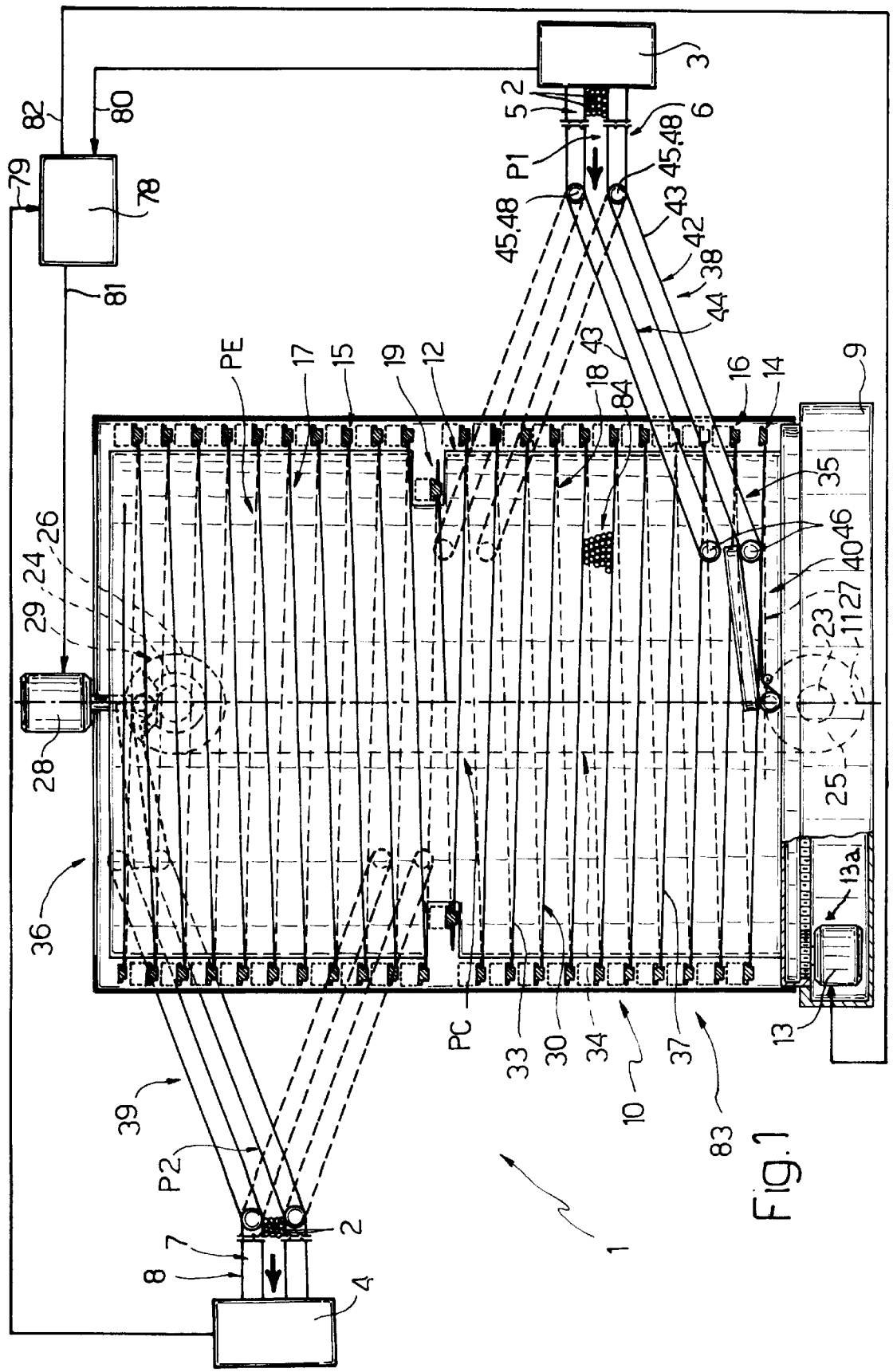
FIG. 1 shows a side view, with parts in section and parts removed for clarity, of a preferred embodiment of the store according to the present invention.

Number 1 in FIG. 1 indicates a variable-capacity store for products preferably comprising cigarettes 2, and which is located between a cigarette manufacturing or supply machine 3 and a packing or receiving machine 4 (both shown schematically in FIG. 1) to store and/or supply variable quantities of cigarettes 2 to compensate for any difference in the output of machines 3 and 4.

Store 1 receives a first substantially continuous stream 5 of cigarettes 2 from a bulk conveyor 6 forming the output of machine 3 and conveying stream 5 at a speed V1 depending on machine 3; and supplies a second substantially continuous stream 7 of cigarettes 2 to a bulk conveyor 8 forming the input of machine 4 and conveying stream 7 at a speed V2 depending on machine 4.

Figure 2:
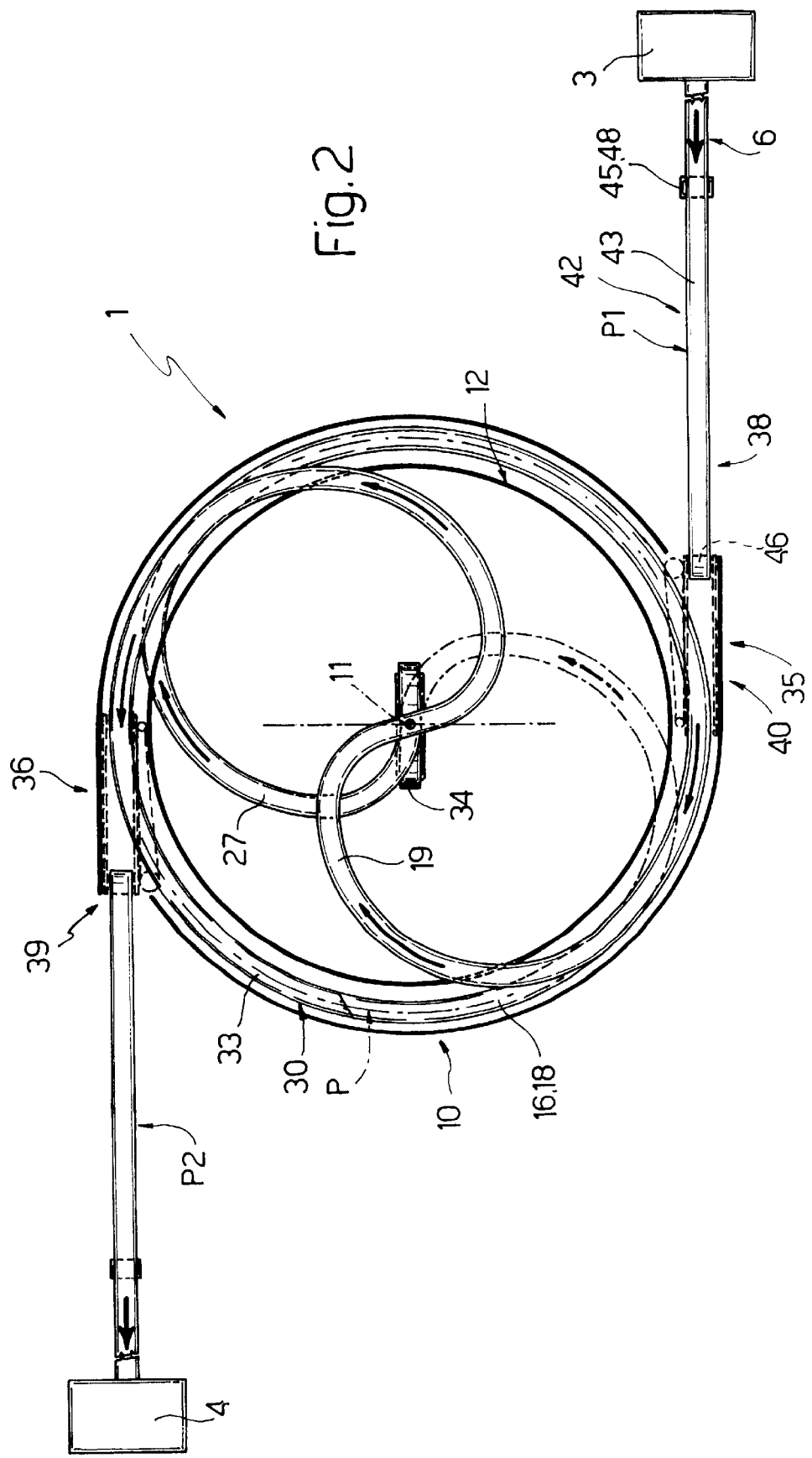
FIG. 2 is a plan view, with parts removed for clarity, of the store in FIG. 1.

As shown in FIGS. 1 and 2, store 1 comprises a base 9; a drum 10 presenting a substantially vertical axis 11, fitted in known manner to base 9 so as to rotate about axis 11, and defined externally by a substantially cylindrical surface 12 coaxial with axis 11; and a reversible motor 13 supported on base 9 and connected to drum 10, via the interposition of a transmission 13a comprising a pinion and an internally-toothed ring gear, to rotate drum 10 clockwise and anti-clockwise (in FIG. 2) about axis 11 at a variable angular speed W1.

Store 1 also comprises a guide 14 fitted to drum 10 and in turn comprising two spiral portions 15, 16 with respective oppositely-inclined spirals 17, 18 coaxial with axis 11, and a substantially S-shaped intermediate connecting portion 19 for connecting portions 15 and 16 and extending internally across and at the center line of drum 10. More specifically, and as shown more clearly in FIG. 6, portions 15 and 16 are fitted to drum 10 via the interposition of a substantially L-shaped bracket 20 comprising a helical wall 21 extending transversely from surface 12, and a cylindrical wall 22 connecting wall 21 to portions 15 and 16.

As shown in FIGS. 1 and 2, store 1 also comprises two supporting shafts 23 and 24 fitted inside drum 10, crosswise to axis 11, located respectively at the bottom end and top end of drum 10, and supporting respective pulleys 25 and 26. The end of portion 16 opposite the end connected to portion 15 is connected to pulley 25 by a further substantially semicircular connecting portion 27 forming an end portion of guide 14 and fitted in known manner to drum 10; and the end of portion 15 opposite the end connected to portion 16 is connected to pulley 26 by a further connecting portion (not shown) forming an initial portion of guide 14, fitted in known manner to drum 10, and symmetrical with portion 27 in relation to axis 11. Pulley 26 is powered by a motor 28 supported on drum 10 and connected to pulley 26 via the interposition of a known perpendicular bevel gear transmission 29.

Store 1 also comprises an endless conveyor belt 30 extending along a given annular path P of fixed shape, fitted in sliding manner to guide 14, and presenting on the underside a longitudinal guide projection 31 engaging in sliding manner a groove 32 formed along guide 14. Belt 30 presents a width approximately equal to but no greater than the length of each cigarette 2, and is looped about pulleys 25 and 26, which define, along belt 30, a helical forward branch 33, and a return branch 34 located inside drum 10 and extending parallel to axis 11. Belt 30 is driven by motor 28, and is fed in sliding manner along guide 14 at a speed V3 equal to the lesser of speeds V1 and V2 of respective conveyors 6 and 8.

Path P presents a substantially helical portion PE defined by portions 15, 16 and 19, and the ends of which are represented by pulleys 25 and 26; and a connecting portion PC for connecting said ends and defined by branch 34.

Finally, store 1 comprises, for cigarettes 2, an input station 35 and an output station 36, which are movable respectively along portions 16 and 15, and define, between them, a transportation portion 37 of belt 30 of variable length L to vary the storage capacity of store 1. Stations 35 and 36 comprise respective articulated conveyors 38 and 39 connecting store 1 to respective conveyors 6 and 8, and respectively defining an input path Pi (FIG. 3) and an output path P2 tangent to the helical portion PE of path P and substantially aligned with respective conveyors 6 and 8. Since conveyors 38 and 39 are identical, the following description of conveyor 38 obviously also applies to conveyor 39.

Figure 3:
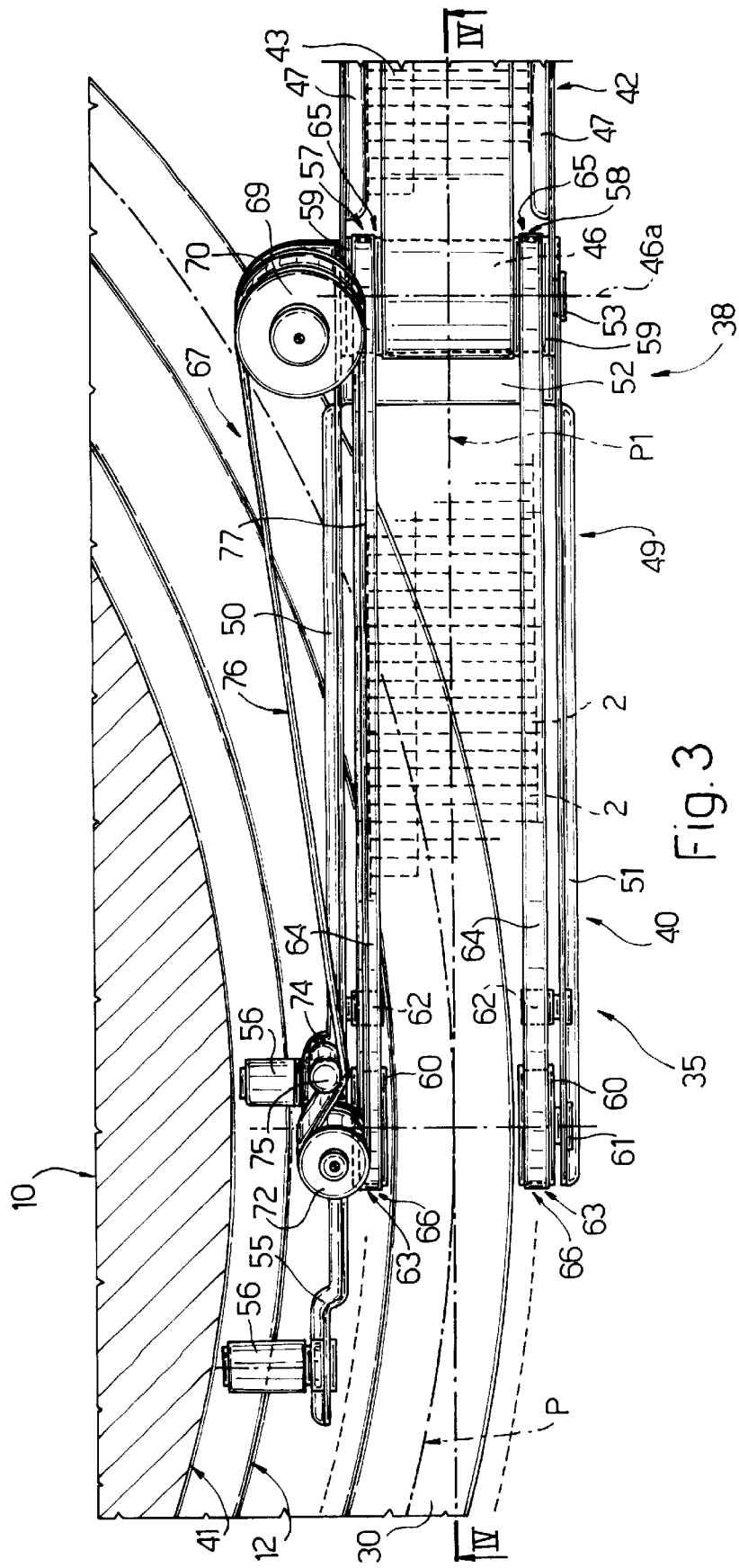
FIG. 3 shows a larger-scale plan view of a detail in FIG. 1.

As shown in FIGS. 1, 3 and 4, conveyor 38 comprises a conveying device 40 movable along portion 16 of guide 14 and, as described in more detail later on, along a helical groove 41 formed in surface 12 of drum 10 and presenting a spiral identical to spiral 18; and a known conveyor 42 for conveying cigarettes 2 in bulk, and which is interposed between conveying device 40 and conveyor 6 along path Pi, and is movable in a vertical plane parallel to path P1 so as to be orientable in relation to both conveying device 40 and conveyor 6.

More specifically, conveyor 42 is defined by a pair of conveyor belts 43 facing each other so as to define a feed channel 44 for stream 5 of cigarettes 2, which, in use, is fed by conveyor 6 into channel 44 and by conveyor 42 to conveying device 40. Each belt 43 presents a width approximately equal to but no greater than the length of cigarette 2, and is looped about a respective pair of pulleys 45 and 46 presenting respective horizontal axes 45a and 46a crosswise to axis 11 of drum 10 and path P1, and which are supported on two parallel brackets 47 separated by a distance, measured along axes 45a and 46a, approximately equal to but no less than the length of cigarette 2. In the FIG. 1 embodiment of store 1, each pulley 45 corresponds to a respective transmission pulley 48 of conveyor 6, and acts as a drive pulley to drive respective belt 43 at the same speed VI as conveyor 6. Alternatively, according to an embodiment not shown of store 1, each pulley 45 of conveyor 42 may be separate from respective pulley 48, and may be driven by a transmission interposed between pulleys 45 and 48, or by a motor controlled in such a manner that the speed of conveyor 42 is equal at all times to speed V1.

Conveying device 40 comprises a frame 49 defined by a fork in turn comprising two parallel shaped lateral walls 50 and 51 made integral with each other by a cross member 52 located beneath bottom pulley 46. Walls 50 and 51 are located on either side of path Pi, and are connected in rotary manner to pulley 46 by two pins 53 and 54 aligned with axis 46a and on either side of pulley 46. Wall 50 faces drum 10, and presents an end appendix 55 supporting two rollers 56, which are located outside frame 49 and engage in sliding manner groove 41 to guide frame 49 along portion 16 of guide 14 in such a manner as to maintain a constant inclination of frame 49 in relation to portion 16.

Conveying device 40 also comprises two substantially similar conveyor belts 57 and 58 located inside frame 49, respectively adjacent to walls 50 and 51, on either side of path Pi, and separated by a distance approximately equal to but no less than the length of cigarette 2. Each conveyor 57, 58 comprises a drive pulley 59 connected integral with pulley 46 between pulley 46 and respective wall 50, 51; a driven pulley 60 fitted to an idle pin 61 presenting an axis 61a parallel to axis 46a and supported for rotation between walls 50 and 51 on the opposite side to portion 16 of guide 14 and substantially facing wall 22 of bracket 20; and a takeup pulley 62 fitted in rotary manner to respective wall 50, 51.

For each conveyor 57, 58, pulleys 59 and 60 support a respective endless belt 63 comprising a transportation branch 64. By virtue of the inclination of frame 49 imposed by rollers 56, each transportation branch 64 presents an input end 65, defined by pulley 59, adjacent to and substantially tangent to bottom belt 43 of conveyor 42; and an output end 66, defined by pulley 60, adjacent to and substantially tangent to conveyor belt 30. As such, in actual use, belts 30 and 43 feed cigarettes 2 along respective paths P and P1 by cooperating with the central portion of the cigarettes, whereas branches 64 of belts 63 feed cigarettes 2 along path P by cooperating with the end portions of the cigarettes, and may therefore receive cigarettes 2 from belts 43 and supply them to belt 30 with no need for known connecting plates (not shown) by which cigarettes 2 may be damaged.

Finally, conveying device 40 comprises a further conveyor belt 67 fitted to wall 50, over a transportation surface 68 for transporting cigarettes 2 and defined by branches 64. Conveyor 67 comprises a drive pulley 69, which is supported crosswise to pulley 46 by an appendix 70 extending transversely from wall 50 and outside frame 49 at input end 65, and is connected angularly to pulley 46 by a bevel gear transmission 71; a driven pulley 72 fitted to an idle pin 73 in turn fitted in rotary manner to an appendix 74 extending transversely from wall 50 and outside frame 49 at output end 66, and facing surface 12 of drum 10; and a takeup pulley 75 fitted in rotary manner to appendix 74.

Pulleys 72 and 69 support an endless belt 76 comprising a transportation branch 77, which is positioned crosswise to surface 68, over the branch 64 relative to wall 50, and acts as a lateral wall cooperating with one end of cigarettes 2.

Operation of store 1 is controlled by a known central control unit 78, which presents two inputs 79 and 80 for receiving respective signals from machines 4 and 3 as a function of operating speeds V2 and VI; and two outputs 81 and 82 connected respectively to motors 28 and 13. Together with drum 10 and guide 14, motor 13 defines an actuating device 83 for varying the positions of stations 35 and 36 along respective portions 16 and 15, and so varying the length L of transportation portion 37 and, hence, the storage capacity of store 1. More specifically, by rotating drum 10 about axis 11, actuating device 83 provides for moving stations 35 and 36 to and from the center line of store 1, along respective portions 16 and 15, and parallel to respective directrices of drum 10 parallel to and on either side of axis 11. In fact, as stated, spirals 17 and 18 of portions 15 and 16, and the respective portions (not shown) of groove 41 associated with portions 15 and 16, are oppositely inclined, so that stations 35 and 36, i.e. conveying devices 40, are forced to move up or down along said directrices when drum 10 is rotated about axis 11.

It should be pointed out that, in the following description, reference will be made to operating speeds V1, V2 and V3, as opposed to the quantity of cigarettes 2 supplied in streams 5 and 7 and in a stream 84 corresponding to belt 30. As such—and this in no way detracts from the validity of the following description—the sections crosswise to the traveling directions of streams 5, 7 and 84 are assumed constant, so that the supply quantities depend solely on the traveling speed of cigarettes 2 along conveyors 6, 8 and belt 30.

Store 1 substantially operates in three ways:

Conveyors 6 and 8 supply cigarettes 2 at the same speed, i.e. machine 3 produces the same number of cigarettes 2 as those packed on machine 4. In this case, control unit 78 receives identical signals at inputs 79 and 80, operates motor 28 so that speed V3 equals speeds V1 and V2, and disables actuating device 83 to fix the position of stations 35 and 36 and hence the length L of transportation portion 37.

Speed V1 is greater than speed V2, i.e. machine 3 produces more cigarettes 2 than can be packed by machine 4. In this case, store 1 must absorb the surplus production by increasing the length L of transportation portion 37. Consequently, control unit 78 first operates motor 28 so that speed V3 equals speed V2; and then operates actuating device 83 so that motor 13 rotates drum 10 clockwise (in FIG. 2) to move stations 35 and 36 away from each other and from the center line of store 1 at such a speed as to increase length L of transportation portion 37 and compensate for the output difference of machines 3 and 4.

Speed V2 is greater than speed V1, i.e. machine 4 packs more cigarettes 2 than can be produced by machine 3. In this case, store 1 must supply cigarettes 2 by reducing the length L of transportation portion 37 of belt 30. Consequently, control unit 78 first operates motor 28 so that speed V3 equals speed V1; and then operates actuating device 83 so that motor 13 rotates drum 10 anticlockwise (in FIG. 2) to move stations 35 and 36 towards each other and towards the center line of store 1 at such a speed as to reduce the length L of transportation portion 37 and compensate for the output difference of machines 3 and 4.

We claim:

1. A variable-capacity store (1) for products (2), which is located between a supply machine (3) supplying the products (2) and a receiving machine (4) receiving the products (2), to compensate for any difference in the output of said machines (3,4); the store (1) comprising an endless conveyer belt (30) extending along a given path (P) of fixed annular shape; first actuating means (28,29) for feeding said conveyer belt (30) along a path (P) at an adjustable speed (V3); an input station (35) and an output station (36) for the products (2); said stations (35,36) being movable along said path (P) and defining, between them, a transportation portion (37) of the conveyor belt (30); and second actuating means (83) for so adjusting the positions of said stations (35,36) along said path (P) as to vary a length (L) of said transportation portion (37) as a function of said difference in output.

2. A store as presented in claim 1, wherein said path (P) includes a substantially helical portion (PE) opposite ends (25,26); and a connecting portion (PC) connecting said two ends (25,26); the input and output sections (35,36) being movable along said helical portion (PE).

3. A store as claimed in claim 2, wherein said helical portion (PE) comprises two oppositely-inclined spiral portions (15, 16) and an intermediate connecting portion (19); the input and output stations (35, 36) each being movable along a respective said spiral portion (16, 15).

4. A store as claimed in claim 3, wherein said second actuating means (83) comprise a drum (10) having a vertical axis (11) coaxial with said helical portion (PE); first guide means (14) for guiding said helical portion (PE), and which are fitted to said drum (10) and connected in sliding manner to said helical portion (PE); and drive means (13) for rotating said drum (10) about said axis (11).

5. A store as claimed in claim 4, wherein second guide means (41) are formed on said drum (10), along said first guide means (14); said input and output stations (35, 36) being connected in sliding manner to said second guide means (41).

6. A store as claimed in claim 1, wherein said input and output stations (35, 36) comprise respective articulated connecting means (38, 39) for respectively connecting the store (1) to said supply machine (3) and said receiving machine (4).

7. A store as claimed in claim 6 wherein said path (P) includes a substantially helical portion (PE) having two opposite ends (25,26); and a connecting portion (PC) connecting said two ends (25,26); the input and output sections (35. 36) being movable along said helical portion and wherein said connecting means (38,39) are defined by respective articulated conveyors (38,39) defining respective paths (P1,P2) tangent to said helical portion (PE).

8. A store as defined in claim 7 wherein said helical portion (PE) comprises two oppositely-inclined spiral portions (15,16) and an intermediate connecting portion (19): the input and output stations (35,36) each being movable along a respective said spiral portion (16,15) and wherein each said articulated conveyor (38,39) comprises a respective end conveying device (40) movable along a respective said spiral portion (16,15), and forming a substantially constant angle with said spiral portion (16,15).

9. A store as claimed in claim 1, wherein said products comprise cigarettes (2); said supply and receiving machines respectively comprising a machine (3) for manufacturing and a machine (4) for packing cigarettes (2).

* * * * *

UNITED STATES PATENT AND TRADEMARK OFFICE
CERTIFICATE OF CORRECTION

PATENT NO. : 5,833,045
DATED : November 10, 1998
INVENTOR(S) : Roberto Osti and Fiorenzo Draghetti It is certified that error appears in the above-indentified patent and that said Letters Patent is hereby corrected as shown below:

Title page, item [73],

Please correct the Assignee's name from

"G.D. Societa' Per Azioni" to read

--G.D Societa' Per Azioni--

Signed and Sealed this

Ninth Day of March, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,833,045
DATED : March 16, 1999
INVENTOR(S) : Yuzuru Wada, et al.

It is certified that error appears in the above-identified patent and that said Letters Patent is hereby corrected as shown below:

Col. 10, Line 35            Delete "formarnidoethyl" and substitute --formamidoethyl--

Signed and Sealed this

Sixteenth Day of November, 1999

Attest:

Q. TODD DICKINSON

*Attesting Officer*      *Acting Commissioner of Patents and Trademarks*